United States Patent
Iinuma

(10) Patent No.: US 9,609,113 B2
(45) Date of Patent: Mar. 28, 2017

(54) TERMINAL, INFORMATION LEAK PREVENTION METHOD, AND COMPUTER-READABLE RECORDING MEDIUM

(71) Applicant: FUJITSU LIMITED, Kawasaki-shi, Kanagawa (JP)

(72) Inventor: Nobuharu Iinuma, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/183,741

(22) Filed: Jun. 15, 2016

(65) Prior Publication Data
US 2017/0013104 A1    Jan. 12, 2017

(30) Foreign Application Priority Data
Jul. 6, 2015   (JP) ................................ 2015-135544

(51) Int. Cl.
| | | |
|---|---|---|
| *H04M 1/725* | (2006.01) | |
| *H04B 1/3827* | (2015.01) | |
| *H04W 12/02* | (2009.01) | |
| *H04W 4/00* | (2009.01) | |
| *H04W 76/02* | (2009.01) | |

(52) U.S. Cl.
CPC .......... *H04M 1/7253* (2013.01); *H04B 1/385* (2013.01); *H04W 4/008* (2013.01); *H04W 12/02* (2013.01); *H04W 76/023* (2013.01)

(58) Field of Classification Search
CPC .... H04M 1/7253; H04B 1/385; H04W 4/008; H04W 12/02; H04W 76/023
USPC .......................................................... 455/41.1
See application file for complete search history.

(56) References Cited

U.S. PATENT DOCUMENTS

| | | | | |
|---|---|---|---|---|
| 7,010,500 | B2* | 3/2006 | Aarnio ............... | G06Q 30/0239 380/247 |
| 7,310,734 | B2* | 12/2007 | Boate .................. | H04L 63/0853 380/270 |
| 8,224,244 | B2* | 7/2012 | Kim ..................... | H04B 13/005 340/13.22 |
| 8,407,279 | B2* | 3/2013 | Kang ................... | H04B 5/0031 709/202 |
| 8,429,405 | B2* | 4/2013 | Roth .................... | H04W 12/04 380/277 |
| 8,581,700 | B2* | 11/2013 | Kawamura ........... | H04N 7/185 340/10.1 |

(Continued)

FOREIGN PATENT DOCUMENTS

| | | |
|---|---|---|
| EP | 2622493 | 8/2013 |
| JP | 2006-345342 | 12/2006 |

(Continued)

*Primary Examiner* — Hai V Nguyen
(74) *Attorney, Agent, or Firm* — Fujitsu Patent Center

(57) ABSTRACT

A wearable device stores data therein. The wearable device transmits the data to a master device registered as a transmission destination of the data when communication is possible with the master device. Then, the wearable device transmits, to the master device, a request to cancel registration of the master device registered as the transmission destination of the data. Thereafter, having received a permission to cancel the registration from the master device, the wearable device cancels the registration of the master device and waits for registration of a device with which communication is possible.

8 Claims, 12 Drawing Sheets

(56) References Cited

U.S. PATENT DOCUMENTS

| | | | | |
|---|---|---|---|---|
| 8,893,164 | B1* | 11/2014 | Teller | G06Q 30/0252 725/12 |
| 9,098,190 | B2* | 8/2015 | Zhou | G06Q 20/3829 |
| 9,100,944 | B2* | 8/2015 | Newham | H04W 4/008 |
| 9,316,980 | B2* | 4/2016 | Miyahara | G03G 15/50 |
| 9,361,084 | B1* | 6/2016 | Costa | G06F 8/61 |
| 9,503,800 | B2* | 11/2016 | Song | H04R 1/08 |
| 9,504,425 | B2* | 11/2016 | Jooste | A61B 5/6898 |
| 2007/0204327 | A1* | 8/2007 | Nishioka | G06F 21/35 726/1 |
| 2008/0195866 | A1* | 8/2008 | Roth | H04W 12/04 713/171 |
| 2008/0287061 | A1* | 11/2008 | Kim | H04B 13/005 455/41.1 |
| 2009/0058611 | A1* | 3/2009 | Kawamura | H04N 7/185 340/10.1 |
| 2010/0017555 | A1* | 1/2010 | Chang | G06F 12/0246 711/103 |
| 2012/0023169 | A1* | 1/2012 | Kang | H04B 13/005 709/205 |
| 2013/0054406 | A1* | 2/2013 | Ritts | G06Q 10/10 705/26.5 |
| 2013/0217332 | A1* | 8/2013 | Altman | H04H 60/90 455/41.2 |
| 2013/0217333 | A1* | 8/2013 | Sprigg | H04W 4/008 455/41.2 |
| 2013/0282753 | A1* | 10/2013 | Sugimoto | G06F 17/30424 707/769 |
| 2014/0306654 | A1* | 10/2014 | Partovi | H02J 7/025 320/108 |
| 2014/0349692 | A1* | 11/2014 | Zhou | G06Q 20/3829 455/466 |
| 2015/0035644 | A1* | 2/2015 | June | G07C 11/00 340/5.61 |
| 2015/0040203 | A1* | 2/2015 | Qian | G06F 21/32 726/7 |
| 2015/0046828 | A1* | 2/2015 | Desai | G06F 1/163 715/739 |
| 2015/0065055 | A1* | 3/2015 | Newham | H04W 4/008 455/41.3 |
| 2015/0081539 | A1* | 3/2015 | Mizuno | G06Q 20/3674 705/41 |
| 2015/0170504 | A1* | 6/2015 | Jooste | A61B 5/6898 340/539.12 |
| 2015/0213722 | A1* | 7/2015 | Nypl | G09B 7/00 705/12 |
| 2015/0241827 | A1* | 8/2015 | Miyahara | G03G 15/50 399/75 |
| 2015/0245186 | A1* | 8/2015 | Park | H04W 4/16 455/417 |
| 2015/0334657 | A1* | 11/2015 | Newham | H04W 4/008 455/41.2 |
| 2015/0341717 | A1* | 11/2015 | Song | H04R 1/08 381/110 |
| 2015/0341902 | A1* | 11/2015 | Ryu | H04M 1/725 455/458 |
| 2015/0341904 | A1* | 11/2015 | Ryu | H04M 1/725 455/458 |
| 2015/0348380 | A1* | 12/2015 | Takayama | G08B 13/14 340/568.1 |
| 2015/0350869 | A1* | 12/2015 | Karshenas Najafabadi | H04W 8/02 455/432.1 |
| 2015/0365979 | A1* | 12/2015 | Park | H04W 76/007 455/404.2 |
| 2015/0379251 | A1* | 12/2015 | Komaki | G06F 21/32 726/19 |
| 2015/0382321 | A1* | 12/2015 | Ryu | H04W 68/02 455/458 |
| 2016/0036962 | A1* | 2/2016 | Rand | H04R 1/1041 455/418 |
| 2016/0037345 | A1* | 2/2016 | Margadoudakis | H04L 63/0853 455/411 |
| 2016/0072882 | A1* | 3/2016 | Ohashi | G06F 19/3418 709/219 |
| 2016/0127850 | A1* | 5/2016 | Kao | H04W 40/32 370/328 |
| 2016/0173169 | A1* | 6/2016 | Liu | G06F 21/32 455/41.1 |
| 2016/0180322 | A1* | 6/2016 | Song | G06Q 40/00 705/44 |
| 2016/0192193 | A1* | 6/2016 | Lee | H04L 63/0853 455/411 |
| 2016/0203276 | A1* | 7/2016 | Castellano | G06F 19/322 705/3 |
| 2016/0253651 | A1* | 9/2016 | Park | G06Q 20/34 |
| 2016/0253670 | A1* | 9/2016 | Kim | G06Q 20/4012 705/72 |
| 2016/0294817 | A1* | 10/2016 | Tan | H04L 63/0838 |
| 2016/0294835 | A1* | 10/2016 | Beaumont | H04L 63/102 |
| 2016/0330601 | A1* | 11/2016 | Srivastava | H04W 4/22 |
| 2016/0342347 | A1* | 11/2016 | Duzly | G06F 3/0619 |

FOREIGN PATENT DOCUMENTS

| | | |
|---|---|---|
| JP | 2013-542510 | 11/2013 |
| WO | 2012044395 | 4/2012 |

* cited by examiner

FIG.4

| DEVICE NAME | BT ADDRESS | CONNECTION STATE |
|---|---|---|
| MASTER DEVICE | D3:E4:F5:0C:1B:2A | PAIRED |

FIG.5

| DEVICE NAME | BT ADDRESS | CONNECTION STATE |
|---|---|---|
| WEARABLE DEVICE | A0:B1:C2:3D:4E:5F | PAIRED |
| SMARTPHONE | A0:B1:C2:DD:44:55 | STANDBY |

FIG.6

PAIRING CANCELLATION REQUEST HAS
BEEN RECEIVED FROM WEARABLE
DEVICE.
PERMIT CANCELLATION?

YES          NO

FIG.11

| DEVICE NAME | BT ADDRESS | CONNECTION STATE |
|---|---|---|
| MASTER DEVICE | D3:E4:F5:0C:1B:2A | PAIRED |
| PC | 00:10:20:30:40:50 | STANDBY |

TERMINAL, INFORMATION LEAK PREVENTION METHOD, AND COMPUTER-READABLE RECORDING MEDIUM

CROSS-REFERENCE TO RELATED APPLICATION

This application is based upon and claims the benefit of priority of the prior Japanese Patent Application No. 2015-135544, filed on Jul. 6, 2015, the entire contents of which are incorporated herein by reference.

FIELD

The embodiments discussed herein are related to a terminal, an information leak prevention method, an information leak prevention program, and an information processing device.

BACKGROUND

Recently, a wearable device has been used as a device for healthcare and fitness. The wearable device is mounted on a human body at, for example, an arm thereof, and measures a blood pressure, a pulse, a heart rate, the amount of activity, the number of steps, position information, and the like. The wearable device, which is used on the human body, has no display unit or an small display unit due to limitation on the size and weight thereof, which makes it difficult to display statistical data, for example.

Such a wearable device transmits measured data to a master device being paired through, for example, Bluetooth (registered trademark) (hereinafter also referred to as BT). Then, the master device manages the measured data by, for example, plotting of a graph of the measured data. Specifically, pairing is executed in advance between the wearable device and the master device such as a personal computer or a smartphone. The wearable device stores the measured data in a memory, for example, and transmits the measured data to the paired master device when communication is possible with the master device. Conventional technologies are described in Japanese National Publication of International Patent Application No. 2013-542510, for example.

However, when the wearable device is stolen or lost, data stored therein such as data measured by the wearable device and a user name set as an ID to the wearable device may be potentially leaked.

For example, the wearable device is not detected by other devices when pairing by BT is established, but is detectable by other devices when in a pairing mode as a connection standby state. The wearable device can be shifted to the pairing mode without limitation. A pairing code used by a device such as the wearable device during pairing is likely to be typically set to "0000" or "1234", which makes pairing easy to be executed by a third party. These days, pairing can be executed through near field communication (NFC) by contacting devices with each other. For these reasons, a lost wearable device is potentially connected with a third-party device so that, for example, measured data of the wearable device is stolen.

SUMMARY

According to an aspect of an embodiment, a terminal includes a memory; and a processor that is connected to the memory, wherein the processor executes a process. The process includes first transmitting data stored in the memory to a device registered as a transmission destination of the data when communication is possible with the device; second transmitting a request to cancel registration of the device to the device; and when a permission to cancel the registration of the device is received from the device, canceling the registration and waiting for registration of a device with which communication is possible.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates exemplary information stored in a connection information DB of the wearable device;

FIG. 5 illustrates exemplary information stored in a connection information DB of a master device;

FIG. 6 illustrates an exemplary screen for requesting pairing cancellation;

FIG. 11 illustrates exemplary information stored in a connection information DB of the wearable device according to a second embodiment;

DESCRIPTION OF EMBODIMENTS

Preferred embodiments will be explained with reference to accompanying drawings. The embodiments do not limit the present invention. The embodiments may be combined as appropriate unless the combination is inconsistent.

[a] First Embodiment

Entire Configuration

Figure 1:
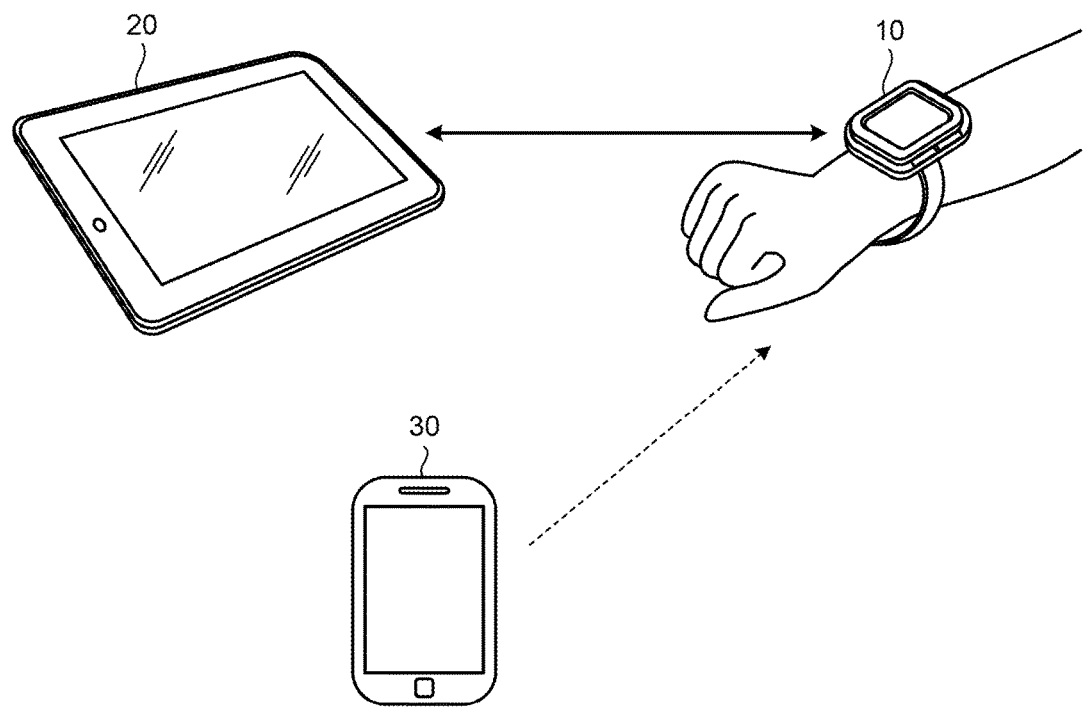
FIG. 1 illustrates an exemplary entire configuration of a system according to a first embodiment.

FIG. 1 illustrates an exemplary entire configuration of a system according to a second embodiment. As illustrated in FIG. 1, this system includes a wearable device 10, a master device 20, and a third-party device 30.

The wearable device 10 is an exemplary terminal having a Bluetooth (registered trademark) (hereinafter also referred to as BT) communication function, and an exemplary sensor device mounted on a human body such as a hand of a user. In the following example, the wearable device 10 can establish pairing with a single device, and is a slave terminal in BT communication in the present embodiment.

The wearable device 10 includes various sensors that measure and store a blood pressure, a pulse, a heart rate, the amount of activity, the number of steps, position information, a travel distance, a running path, a sleep time, a bedtime, a wake-up time, and the like. The wearable device 10 executes pairing with the master device 20 by BT communication. Then, the wearable device 10 transmits various measured data to the master device 20 registered and paired as a device with which communication is possible.

Figure 2:
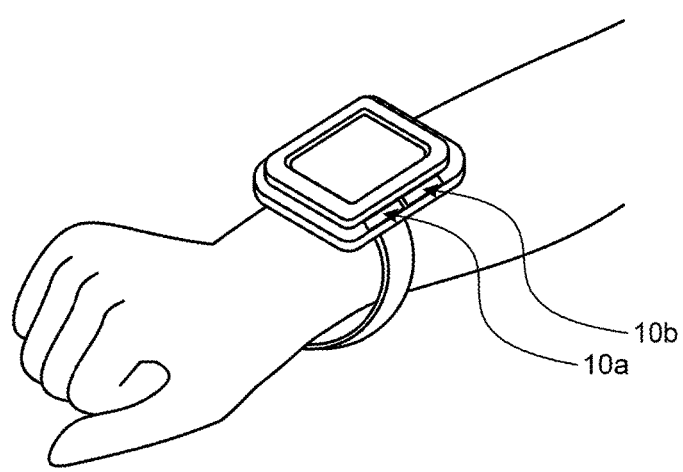
FIG. 2 illustrates a wearable device.

The following describes the wearable device 10. FIG. 2 illustrates the wearable device 10. As illustrated in FIG. 2, the wearable device 10 includes a power button 10a and a pairing button 10b. The power button 10a is a button for turning on and off the wearable device 10. The pairing button 10b is a button for shifting the wearable device 10 into a pairing mode that allows other devices to detect the wearable device 10 as a pairing target.

The master device 20 is a device that has a BT communication function and manages data, and is an exemplary information processing device such as a personal computer, a smartphone, and a tablet device of a user who owns the wearable device 10. The master device 20 is a master terminal in BT communication in the present embodiment, and is an exemplary device registered as a data transmission destination in the wearable device 10.

The master device 20 receives measured data from the paired wearable device 10. Then, the master device 20 executes an application provided by, for example, the manufacturer of the wearable device 10, so as to extract a lifestyle, a health state, an activity pattern, and the like from the measured data of the wearable device 10.

The master device 20 may transmit the measured data additionally to a cloud server not illustrated. The cloud server stores therein the measured data for each user, and can provide various kinds of advice to the user through various services provided by a fitness club and a medical institution. The user can back up the measured data by transmitting the data to the cloud server and storing the data therein.

The third-party device 30 is a terminal that has a BT communication function and is owned by a party other than the user of the wearable device 10, and is an exemplary smartphone or tablet device used by a malicious user.

In such a system, when communication is possible with the master device 20 registered as a transmission destination of data stored in a storage unit, the wearable device 10 transmits the data to the master device 20. The wearable device 10 transmits, to the master device 20, a request to cancel the registration of the master device 20 as the transmission destination. Having received a permission of the cancellation from the master device 20, the wearable device 10 cancels the registration of the master device 20 as the transmission destination, and waits for registration of another device with which communication is possible.

For example, the wearable device 10 stores therein the BT address of the master device 20 and is paired with the master device 20. This prevents the malicious third-party device 30 from detecting the wearable device 10 as a pairing target when the malicious third-party device 30 can communicate with the wearable device 10 in the pairing mode. Assume that the malicious third party steals the wearable device 10 and cancels pairing with the master device 20 to shift the wearable device 10 into the pairing mode. In this case, the third-party device 30 can detect the wearable device 10 as a pairing target.

However, the wearable device 10 according to the first embodiment does not shift to a state in which new pairing is acceptable, unless the paired master device 20 permits pairing cancellation. This prevents the malicious third party, who has stolen the wearable device 10, from canceling pairing of the wearable device 10 with the master device 20. In this manner, the wearable device 10 can prevent unauthorized pairing and data leak.

Functional Configuration

Figure 3:
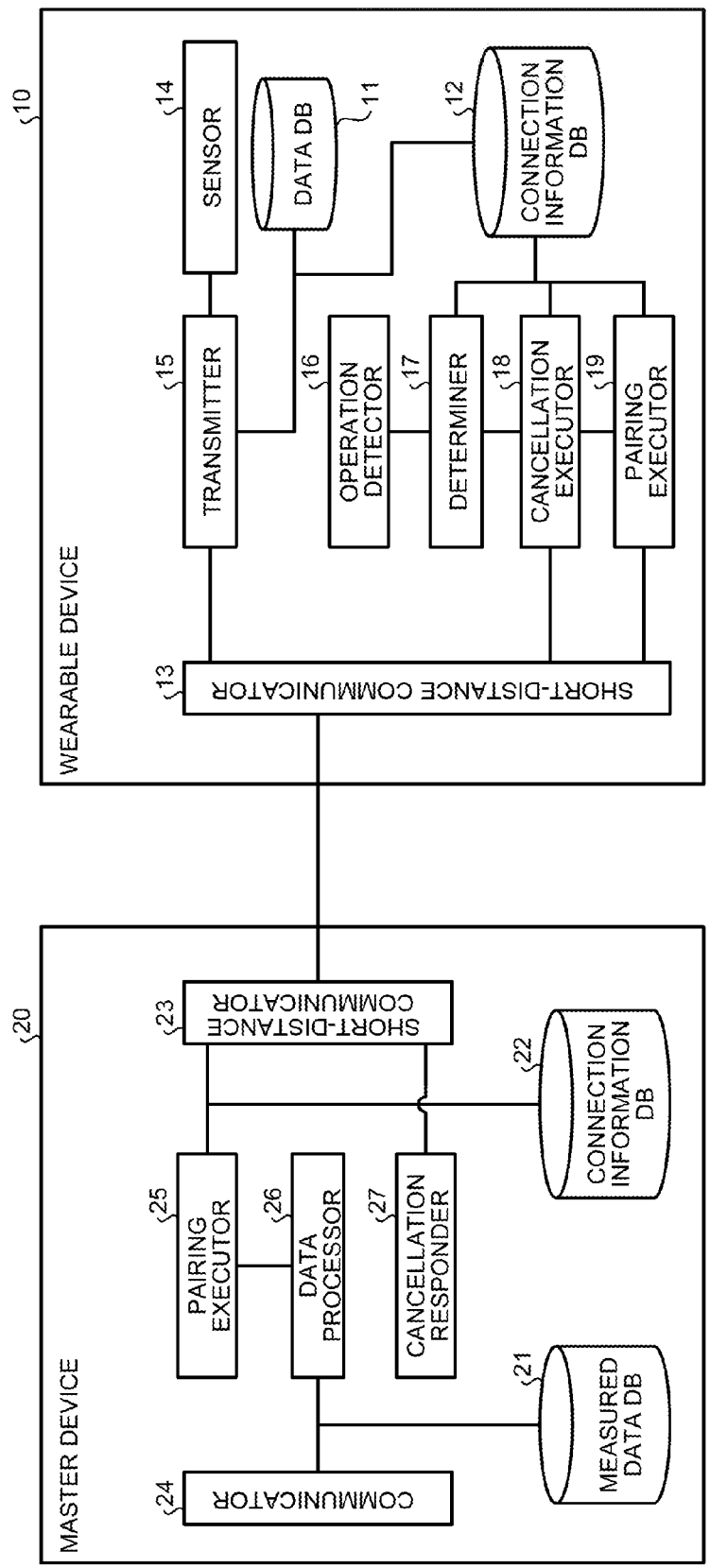
FIG. 3 is a functional block diagram of a functional configuration of the system according to the first embodiment.

The following describes functional configurations of the devices included in the system illustrated in FIG. 1. FIG. 3 is a functional block diagram of a functional configuration of the system according to the first embodiment. The third-party device 30 has the same functional configuration as those of typical tablet device and smartphone, and a detailed description thereof thus will be omitted. The following describes the wearable device 10 and the master device 20.

Functional Configuration of Wearable Device 10

As illustrated in FIG. 3, the wearable device 10 includes a data DB 11, a connection information DB 12, a short-distance communicator 13, a sensor 14, a transmitter 15, an operation detector 16, a determiner 17, a cancellation executor 18, and a pairing executor 19.

The data DB 11 and the connection information DB 12 are stored in storage devices such as a memory and a hard disk. The short-distance communicator 13, the sensor 14, the transmitter 15, the operation detector 16, the determiner 17, the cancellation executor 18, and the pairing executor 19 are exemplary electronic circuits included in a processor, or exemplary processes executed by the processor.

The data DB 11 is a database that stores various kinds of data, and is an exemplary storage unit. For example, the data DB 11 stores therein data measured by the sensor 14 to be described later and user information set by a user. Examples of the measured data include a blood pressure, a pulse, a heart rate, the amount of activity, and the number of steps. Examples of the user information include a full name, an address, and physical information such as height and weight.

The connection information DB 12 is a database that stores therein paired connection-destination information. For example, the connection information DB 12 stores therein information on the master device 20. The stored information is updated by the short-distance communicator 13 and the pairing executor 19 to be described later, and deleted by the cancellation executor 18, for example.

FIG. 4 illustrates exemplary information stored in the connection information DB 12 of the wearable device 10. As illustrated in FIG. 4, the connection information DB 12 stores therein "device name, BT address, connection state" in association with each other. The "device name" is set to the name of a device as a connection destination. The "BT address" is set to address information used in BT. The "connection state" is set to a connection state, and specifically set to "paired" when pairing is established and to "connected" when BT connection is established or during data communication. FIG. 4 illustrates an example in which the wearable device 10 is paired with the master device 20 at a "BT address" of "D3:E4:F5:0C:1B:2A".

The short-distance communicator 13 is a processor configured to execute data communication by short-distance wireless communication such as BT. For example, when a BT function is activated, the short-distance communicator 13 transmits a communication request to a paired device at "BT address (D3:E4:F5:0C:1B:2A)" stored in the connection information DB 12. Then, having received a response from the device at "BT address (D3:E4:F5:0C:1B:2A)", the short-distance communicator 13 establishes BT communication with the device at "BT address (D3:E4:F5:0C:1B: 2A)". Then, the short-distance communicator 13 updates the "connection state" of the connection information DB 12 to "connected".

The sensor 14 is a processor configured to execute data sensing through various sensors included in the wearable device 10 and store sensing data in the data DB 11. The sensor 14 acquires, for example, the number of steps measured by a pedometer and a blood pressure measured by a blood-pressure meter, and stores the acquired data in the data DB 11. Theses sensors are exemplary, and various kinds of other typically used sensors can be used.

The transmitter 15 is a processor configured to transmit the sensing data stored in the data DB 11 to the master device 20. For example, having detected update of the "connection state" of the connection information DB 12 to "connected", the transmitter 15 reads out the sensing data stored in the data DB 11. Then, the transmitter 15 transmits the read sensing data to the master device 20 through the short-distance communicator 13.

The operation detector 16 is a processor configured to detect a power operation and a pairing operation on the wearable device 10. For example, having detected a press on the pairing button 10b, the operation detector 16 determines that an instruction to shift into the pairing mode has been received, and transmits a request to determine a pairing state to the determiner 17.

Having detected a press on the power button 10a when the wearable device 10 is on, the operation detector 16 turns off the wearable device 10. Having detected a press on the power button 10a when the wearable device 10 is off, the operation detector 16 turns on the wearable device 10.

The determiner 17 is a processor configured to determine, having received an instruction to shift to the pairing mode, whether a paired master exists. Specifically, having received a request to determine the pairing state from the operation detector 16, the determiner 17 refers to the connection information DB 12 to determine whether the connection-destination information on a paired device is registered. If the connection-destination information on the paired device exists, the determiner 17 requests pairing cancellation to the cancellation executor 18. If no connection-destination information on the paired device exists, the determiner 17 requests the pairing executor 19 to shift to the pairing mode.

For example, if data of "master device, D3:E4:F5:0C:1B: 2A, paired" is registered as "device name, BT address, connection state" in the connection information DB 12, the determiner 17 determines that the paired master device 20 exists. Alternatively, the determiner 17 determines that no paired master exists if data of "device name, BT address, connection state" is not registered in the connection information DB 12.

The cancellation executor 18 is a processor configured to execute pairing cancellation. For example, having received a pairing cancellation request from the determiner 17, the cancellation executor 18 deletes data of "master device, D3:E4:F5:0C:1B:2A, paired" registered in the connection information DB 12. Then, when the pairing cancellation is completed, the cancellation executor 18 deletes the data stored in the data DB 11 and requests the pairing executor 19 to shift to the pairing mode. The cancellation executor 18 is exemplary requester and controller.

The pairing executor 19 is a processor configured to shift to the pairing mode and execute pairing. For example, having received a request from the determiner 17 or the cancellation executor 18, the pairing executor 19 shifts the wearable device 10 to the pairing mode. Then, having received a BT pairing request from another device, the pairing executor 19 in the pairing mode executes pairing. Thereafter, the pairing executor 19 acquires "device name, BT address" while executing pairing processing, and stores "device name, BT address, paired" in the connection information DB 12.

The pairing mode and the pairing processing executed above are typical processing executed by a slave in the BT pairing processing, and a detailed description thereof thus will be omitted. For example, the pairing mode is an exemplary connection standby state in which the slave device is detectable from another device by transmitting a BT detection signal or responding to a detection signal received from the other device. The pairing processing executes, for example, inquiry processing and paging processing, and executes response of a device name, a BT address, and the like to a master, and acquisition of a device name, a BT address, and the like from the master. The pairing executor 19 is exemplary acquirer and registration requester.

Functional Configuration of Master Device 20

As illustrated in FIG. 3, the master device 20 includes a measured data DB 21, a connection information DB 22, a short-distance communicator 23, a communicator 24, a pairing executor 25, a data processor 26, and a cancellation responder 27.

The measured data DB 21 and the connection information DB 22 are stored in storage devices such as a memory and a hard disk. The short-distance communicator 23, the communicator 24, the pairing executor 25, the data processor 26, and the cancellation responder 27 are exemplary electronic circuits included in a processor, or exemplary processes executed by the processor.

The measured data DB 21 is a database that stores therein measured data received from the wearable device 10. For example, the measured data DB 21 stores therein measured data for each identifier for identifying the wearable device 10 or each identifier for identifying a user.

The connection information DB 22 is a database that stores therein the connection-destination information on a paired device. For example, the connection information DB 22 stores therein information on the wearable device 10. This stored information is updated by the short-distance communicator 23 and the pairing executor 25 to be described later, for example.

FIG. 5 illustrates exemplary information stored in the connection information DB 22 of the master device 20. As illustrated in FIG. 5, the connection information DB 22 stores therein "device name, BT address, connection state" in association with each other. The stored information is the same as that in FIG. 4, and a detailed description thereof thus will be omitted. In the example in FIG. 5, the master device 20 is paired with the wearable device 10 at the "BT address" of "A0:B1:C2:3D:4E:5F". In the example, the master device 20 was paired with a smartphone at the "BT address" of "A0:B1:C2:DD:44:55" in the past.

The short-distance communicator 23 is a processor configured to execute data communication by short-distance wireless communication such as BT. For example, when a BT function is activated, the short-distance communicator 23 transmits a communication request to a paired device at "BT address (A0:B1:C2:3D:4E:5F)" stored in the connection information DB 22. Then, having received a response from the device at "BT address (A0:B1:C2:3D:4E:5F)", the short-distance communicator 23 establishes BT communication with the device at "BT address (A0:B1:C2:3D:4E:

5F)". Then, the short-distance communicator 23 updates the "connection state" of the connection information DB 22 to "connected".

The communicator 24 is a processor configured to control communication with the cloud server not illustrated through wired communication and wireless communication. For example, the communicator 24 transmits data read from the measured data DB 21 by the data processor 26 to the cloud server not illustrated.

The pairing executor 25 is a processor configured to shift to the pairing mode and execute pairing. Specifically, the pairing executor 25 transmits a BT pairing request and then causes information such as the device name of any slave that has responded to the request to be displayed on a display not illustrated, for example. Thereafter, the pairing executor 25 executes pairing with a slave selected by a user. The pairing executor 25 acquires information on the name and address of the slave in the pairing processing, and stores the acquired information in the connection information DB 22 when the pairing is completed.

The pairing mode and the pairing processing executed above are typical processing executed by a master in the BT pairing processing, and a detailed description thereof thus will be omitted. The pairing processing executes, for example, inquiry processing and paging processing to search for any slave in the pairing mode as the connection standby state, and acquires information such as an address from a slave specified as a pairing target.

The data processor 26 is a processor configured to receive data from a paired slave and execute various kinds of processing on the received data. Specifically, the data processor 26 receives data from the paired wearable device 10 and stores the data in the measured data DB 21. Then, the data processor 26 executes processing related to, for example, the number of steps per day, a travel distance per day, and the average number of steps per week, in a period determined in advance or at a timing instructed by a user.

For example, the data processor 26 causes results obtained by various kinds of processing to be displayed on a display, or stores the results in the storage unit. The data processor 26 transmits data stored in the measured data DB 21 to the cloud server not illustrated in the period determined in advance or at the timing specified by the user.

The cancellation responder 27 is a processor configured to receive a pairing cancellation request from a paired slave and respond to this cancellation request. For example, having received a cancellation request from the wearable device 10, the cancellation responder 27 causes a cancellation request screen to be displayed on the display. FIG. 6 illustrates an exemplary screen for requesting pairing cancellation.

The request screen illustrated in FIG. 6 displays a message indicating that the pairing cancellation request is received from the wearable device 10, and "Yes" and No buttons. If the "Yes" button is selected, the cancellation responder 27 responds to the wearable device 10 with a message indicating permission of cancellation. Thereafter, the cancellation responder 27 deletes data of "wearable device, A0:B1:C2:3D:4E:5F, paired" registered in the connection information DB 22. If the "No" button is selected, the cancellation responder 27 responds to the wearable device 10 with a message indicating denial of cancellation. The cancellation responder 27 is exemplary receiver and responder.

Process of Processing

The following describes processing executed in the system illustrated in FIG. 1. The description will be made on a sequence from start of pairing to cancellation thereof, processing at the wearable device 10 as a slave, and processing at the master device 20 as a master.

Sequence

Figure 7:
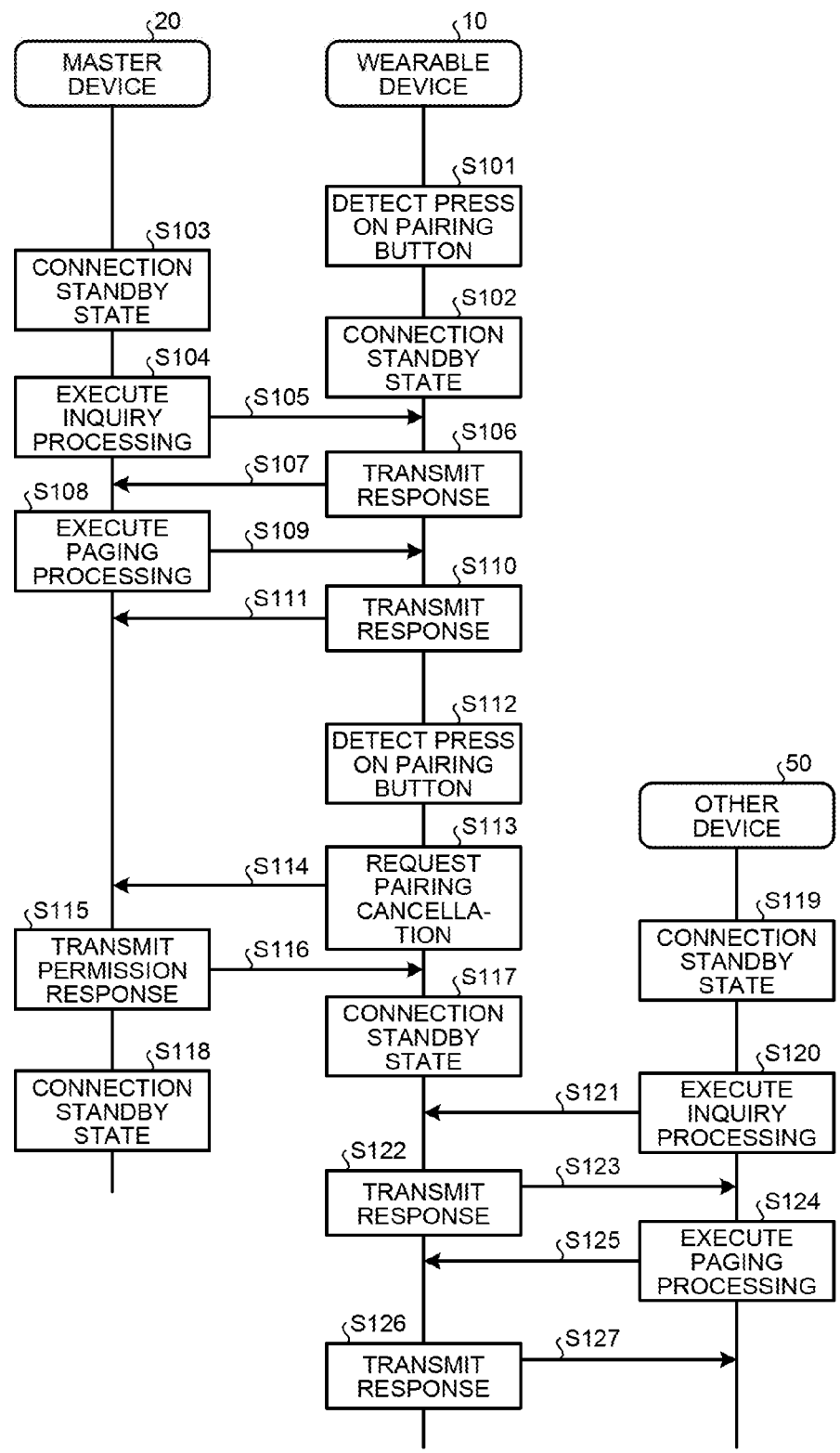
FIG. 7 is a sequence diagram of a process from start of pairing to cancellation thereof.

FIG. 7 is a sequence diagram of a process from start of pairing to cancellation thereof. The following describes an example in which the wearable device 10 switches pairing with the master device 20 as a legitimate master to pairing with another device 50 as a legitimate master. The other device 50 is an exemplary reliable computer or tablet device such as a device owned by the user of the wearable device 10.

As illustrated in FIG. 7, when the operation detector 16 detects a press on the pairing button 10b (S101), the pairing executor 19 of the wearable device 10 shifts to the pairing mode as the connection standby state (S102).

Meanwhile, the pairing executor 25 of the master device 20 in the pairing mode, in other words, in the connection standby state (S103) starts pairing by executing inquiry processing to search for a slave (S104 and S105). Specifically, the master device 20 transmits a BT inquiry signal to any device nearby.

Then, the pairing executor 19 of the wearable device 10 in the pairing mode transmits a response to the inquiry signal from the master device 20 (S106 and S107). Accordingly, the pairing executor 25 of the master device 20 detects the wearable device 10, and executes paging processing (S108 and S109). Specifically, the master device 20 calls, as a pairing target, the wearable device 10 specified by the user, for example.

In response to the call, the pairing executor 19 of the wearable device 10 in the pairing mode transmits a response to the master device 20 (S110 and S111). This completes pairing and hence connection between the master device 20 and the wearable device 10. The processing at S106 and S110 is automatically performed, and at any one of these steps, a pairing code may be automatically transmitted from the wearable device 10 to the master device 20.

In this state, when the operation detector 16 detects a press on the pairing button 10b (S112), the cancellation executor 18 of the wearable device 10 transmits a pairing cancellation request to the master device 20 (S113 and S114).

Then, having received this cancellation request, the cancellation responder 27 of the master device 20 transmits a permission response to the pairing cancellation request, (S115 and S116). As a result, the wearable device 10 shifts to the pairing mode as the connection standby state (S117), and the master device 20 shifts to the pairing mode as the connection standby state (S118). At this stage, the cancellation executor 18 of the wearable device 10 deletes information stored in the data DB 11.

Thereafter, the other device 50 in the pairing mode, in other words, in the connection standby state (S119) starts pairing by executing inquiry processing to search for a slave (S120 and S121).

Then, the pairing executor 19 of the wearable device 10 in the pairing mode transmits a response to an inquiry signal from the other device 50 (S122 and S123). Accordingly, the other device 50 detects the wearable device 10, and executes paging processing (S124 and S125).

In response to this, the pairing executor 19 of the wearable device 10 in the pairing mode transmits a response to the other device 50 (S126 and S127). This completes pairing and hence connection between the other device 50 and the wearable device 10.

Processing at Wearable Device 10

Figure 8:
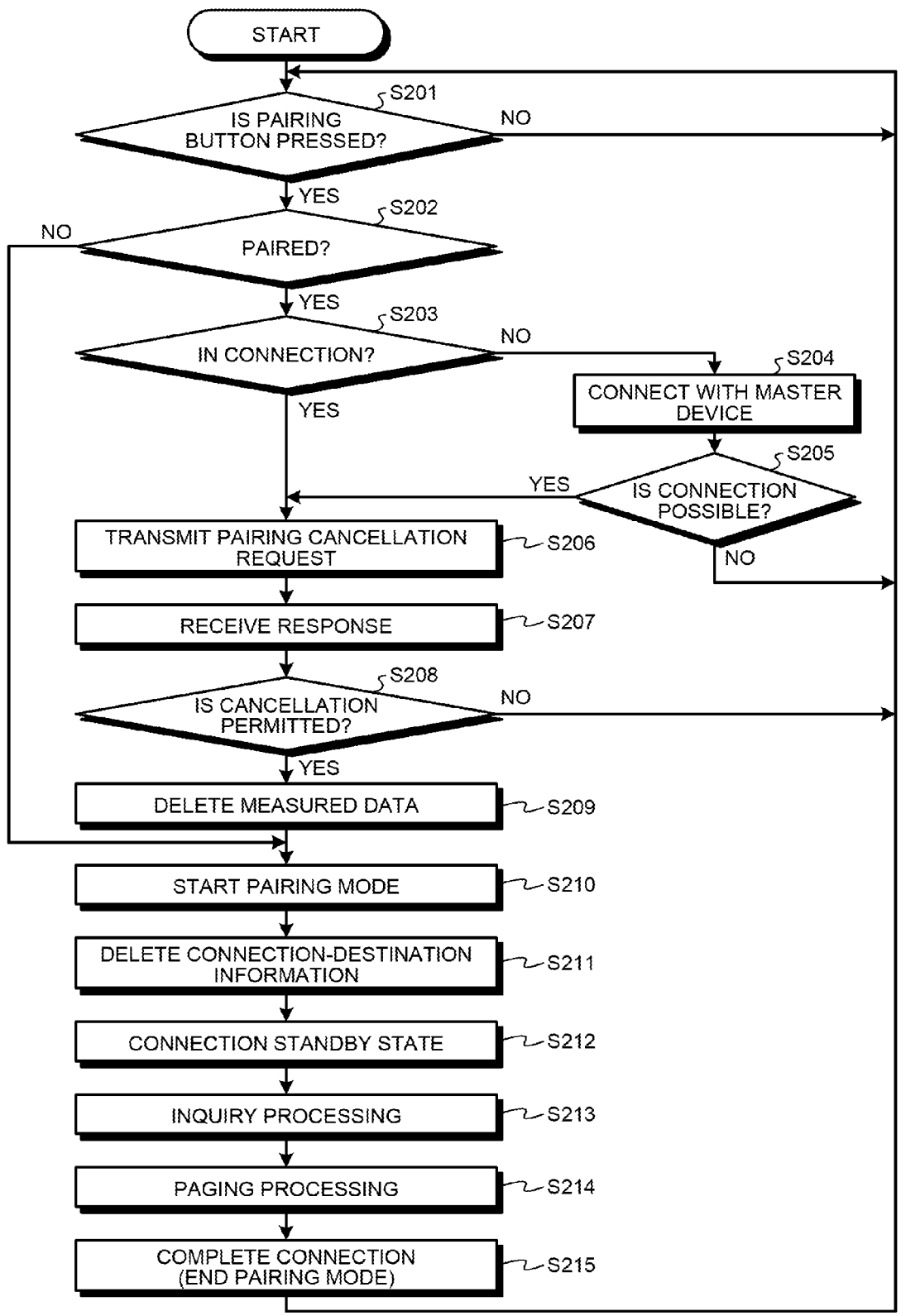
FIG. 8 is a flowchart of the process of pairing processing executed by the wearable device.

FIG. 8 is a flowchart of the process of pairing processing executed by the wearable device 10. As illustrated in FIG. 8, if the operation detector 16 detects a press on the pairing button 10b (Yes at S201), the determiner 17 determines whether pairing is made with the master device 20 (S202).

Then, if the determiner 17 determines that the pairing is made with the master device 20 (Yes at S202), the cancellation executor 18 determines whether the wearable device 10 is in connection with the master device 20 (S203). For example, the cancellation executor 18 refers to the connection information DB 12 to determine whether the connection state is "connected".

If it is determined that the wearable device 10 is not in connection with the master device 20 (No at S203), the cancellation executor 18 establishes connection with the master device 20 through the short-distance communicator 13 (S204). If the connection is not established (No at S205), the processing at S201 and later is repeated.

If the connection is established (Yes at S205) or the wearable device 10 is in connection with the master device 20 (Yes at S203), the cancellation executor 18 transmits a pairing cancellation request to the master device 20 (S206).

Then, when a response is received from the master device 20 (S207), and the received response does not permit cancellation (No at S208), the processing at S201 and later is repeated.

If the received response permits cancellation (Yes at S208), the cancellation executor 18 deletes measured data stored in the data DB 11 (S209). Thereafter, the pairing executor 19 starts the pairing mode (S210), and the cancellation executor 18 deletes the connection-destination information stored in the connection information DB 12 (S211). As a result, the wearable device 10 shifts to the connection standby state (S212).

Thereafter, the pairing executor 19 executes inquiry processing in response to a search request from the master device (S213), and executes paging processing in response to a connection request from the master device (S214). Thereafter, the pairing executor 19 completes connection with the master device (S215).

Cancellation Processing at Master Device 20

The following describes pairing cancellation processing at the master device 20. Pairing execution processing is the same as typical pairing processing, and a detailed description thereof thus will be omitted.

Figure 9:
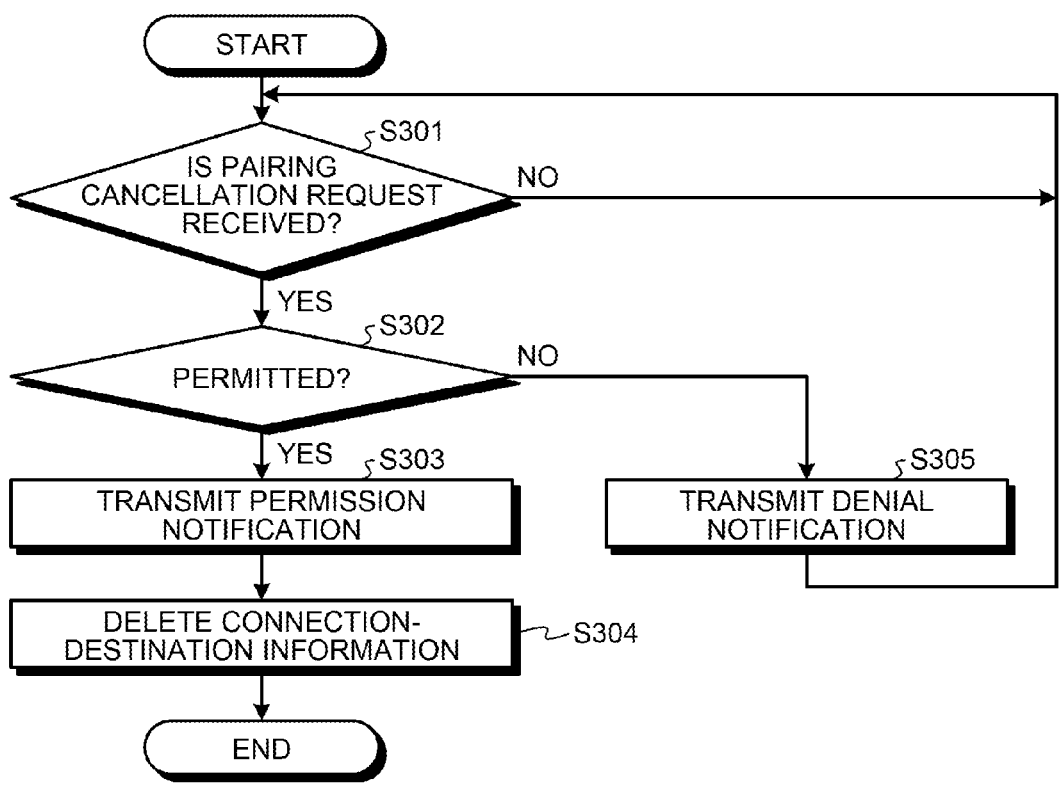
FIG. 9 is a flowchart of the process of pairing cancellation processing by a master device.

FIG. 9 is a flowchart of the process of the pairing cancellation processing at the master device 20. As illustrated in FIG. 9, if the cancellation responder 27 receives a pairing cancellation request (Yes at S301) and the user selects to permit cancellation (Yes at S302), the cancellation responder 27 transmits a permission notification to the wearable device 10 (S303). Thereafter, the cancellation responder 27 deletes the connection-destination information corresponding to the wearable device 10 stored in the connection information DB 22 (S304).

If the user selects not to permit cancellation (No at S302), the cancellation responder 27 transmits a denial notification to the wearable device 10 (S305), and the process returns to S301 to repeat the subsequent processing.

Comparison of Pairing Cancellation Operations

Figure 10:
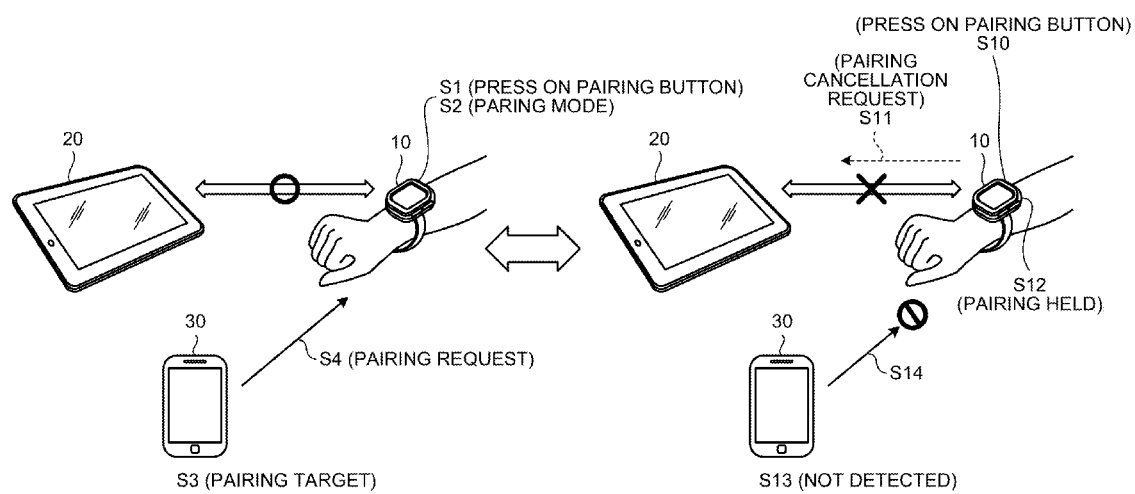
FIG. 10 illustrates comparison of pairing cancellation operations.

The following describes pairing cancellation operations according to the conventional technology and the first embodiment in detail. The description will be made on an example in which a malicious third party steals the wearable device 10 and tries to pair the wearable device 10 with the third-party device 30. FIG. 10 illustrates comparison of pairing cancellation operations. In states illustrated in FIG. 10, the wearable device 10 and the master device 20 are paired with each other.

The left diagram in FIG. 10 illustrates conventional pairing cancellation. If the pairing button 10b is pressed (S1), the wearable device 10 cancels pairing with the master device 20 (S2). As a result, the wearable device 10 shifts to the pairing mode.

Thereafter, having entered in a range in which communication is possible with the wearable device 10 in the pairing mode, the third-party device 30 in the pairing mode detects the wearable device 10 as a pairing slave (S3). Then, the third-party device 30 transmits a pairing request to the wearable device 10 (S4). As a result, the third-party device 30 can be paired with the wearable device 10.

The right diagram in FIG. 10 illustrates that the wearable device 10 and the master device 20 are paired with each other as in the left diagram. In this state, if the pairing button 10b is pressed (S10), the wearable device 10 transmits a pairing cancellation request to the master device 20 (S11). However, the pairing cancellation request does not reach the master device 20, and no cancellation permission is transmitted from the master device 20 to the wearable device 10. Because the pairing is not canceled, the wearable device 10 does not shift to the pairing mode (S12).

Thereafter, when positioned where communication is possible with the wearable device 10, the third-party device 30 in the pairing mode does not detect the wearable device 10 (S13), and does not transmit a pairing request to the wearable device 10 (S14). As a result, the third-party device 30 and the wearable device 10 are not connected by the pairing.

Effects

As described above, the wearable device 10 does not cancel pairing without permission by the master device 20. This prevents an unauthorized third party who has stolen the wearable device 10 from connecting the wearable device 10 with another master. Accordingly, unauthorized pairing with the wearable device 10 can be prevented, and leak of data stored in the wearable device 10 thus can be prevented. In addition, the incapability to cancel pairing acts as a deterrent against stealing of the wearable device 10.

A user can be identified by comparing measured data stored in the wearable device against a database on an application provided by the manufacturer of the wearable device and a database on the cloud server. For example, basic data such as a full name, a height, a weight, and a stride length is registered in these application and cloud server in some cases. Moreover, a lifestyle, a health state, an activity range, an activity pattern, and the like can be identified based on a history of the measured data, for example.

However, the wearable device 10 according to the first embodiment does not cancel pairing without permission by the master device 20, thereby preventing unauthorized master switching, for example. This can also prevent identification of private information based on data in the wearable device 10 by using the cloud server, for example.

The wearable device 10 according to the first embodiment deletes stored data before canceling pairing and shifting to the pairing mode. With this configuration, even when having succeeded in pairing with the wearable device 10, the third-party device 30 does not read data from the wearable device 10. In this manner, data and private information can be prevented from being leaked.

[b] Second Embodiment

The First embodiment describes the example in which the wearable device 10 transmits a pairing cancellation request to the master device 20 registered as the transmission destination of data, but the present invention is not limited thereto. According to a second embodiment, the wearable device 10 can cancel pairing with the master device 20 by various methods.

The following describes an example in which the wearable device 10 cancels pairing with the master device 20 by using a reliable other device. In the following example, the wearable device 10 stores therein the connection-destination information on a plurality of masters, and requests pairing cancellation to another master having a high reliability, when being unable to receive a response from a paired master.

FIG. 11 illustrates exemplary information stored in the connection information DB 12 of the wearable device 10 according to the second embodiment. As illustrated in FIG. 11, the connection information DB 12 stores therein "master device, D3:E4:F5:0C:1B:2A, paired" and "PC, 00:10:20:30:40:50, standby" as "device name, BT address, connection state".

In such a state, the cancellation executor 18 of the wearable device 10 transmits a pairing cancellation request to the paired master device 20, but receives no response from the master device 20. In this case, the cancellation executor 18 transmits a request to cancel pairing with the master device 20 to a highly reliable PC that is previously registered and of which information is stored in the connection information DB 12. Then, having received a cancellation permission from the PC, the cancellation executor 18 deletes "master device, D3:E4:F5:0C:1B:2A, paired" stored in the connection information DB 12 and cancels pairing.

At this stage, the cancellation executor 18 may transmit a pairing cancellation request by BT communication if a BT function is available, or may transmit the pairing cancellation request through other communications if the BT function is unavailable. For example, the cancellation executor 18 may transmit the cancellation request in various signals including a BT search signal, or may transmit the cancellation request through communication such as NFC. If the internet protocol (IP) address of the PC is known, the cancellation executor 18 may transmit the cancellation request through IP communication and receive a response through IP communication.

As described above, the wearable device 10 registers a plurality of masters, and thus can execute pairing with a new master when a paired master device 20 has failed. Having detected a failure to establish connection with the wearable device 10 for a predetermined duration, for example, two days or more, the master device 20 deletes the connection-destination information on the wearable device 10.

[c] Third Embodiment

The second embodiment describes the example in which the wearable device 10 cancels pairing through a master different from the paired master device 20, but the present invention is not limited thereto. A third embodiment describes an example in which, when the wearable device 10 does not receive a cancellation permission from the paired master device 20, the wearable device 10 serves as a master to execute new pairing with another device 60. The other device 60 is an exemplary reliable computer or tablet device such as a device owned by the user of the wearable device 10.

Figure 12:
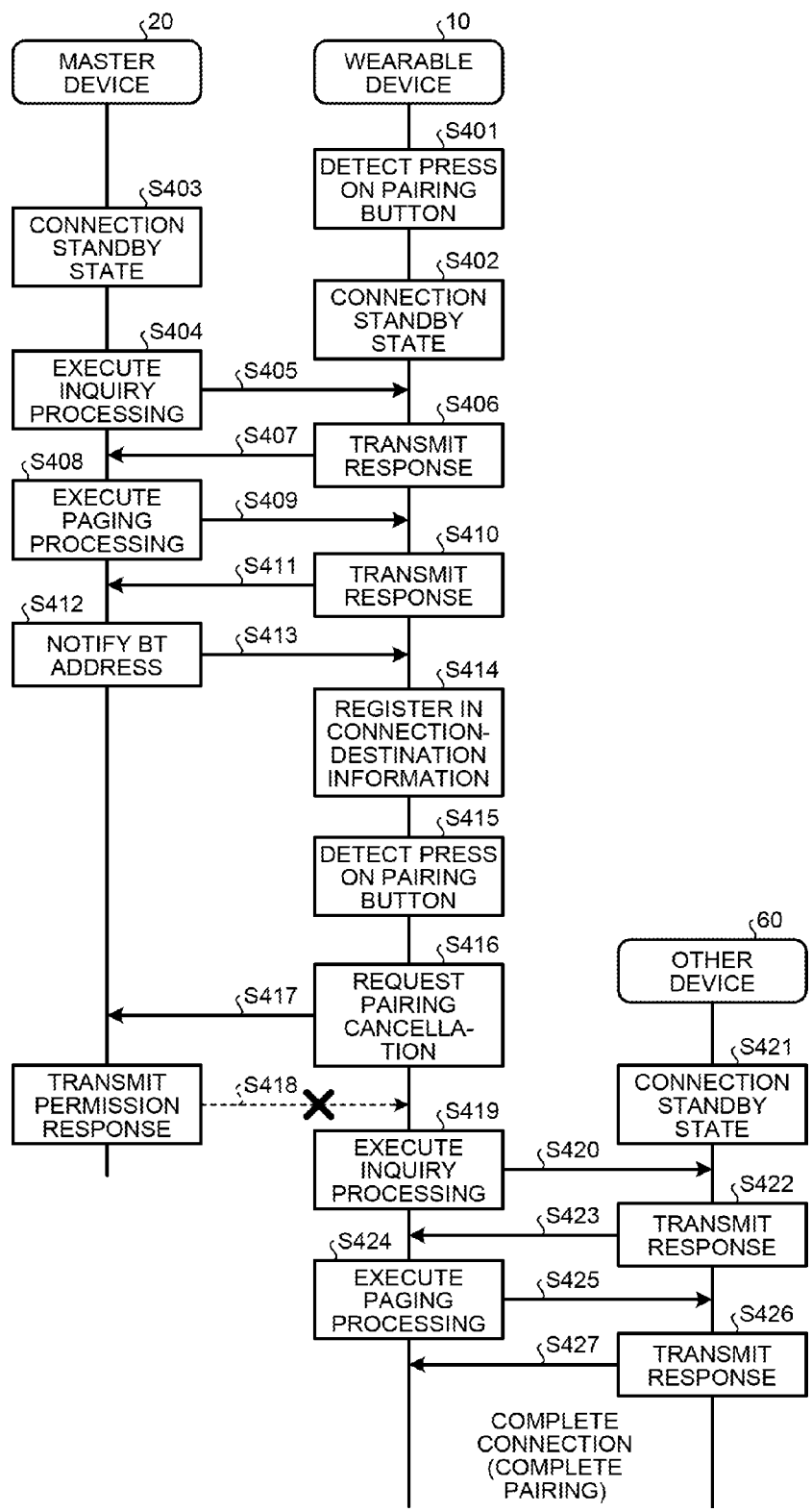
FIG. 12 is a sequence diagram of the process of processing in which the wearable device serves as a master.

FIG. 12 is a sequence diagram of the process of processing in which the wearable device 10 serves as a master. As illustrated in FIG. 12, if the operation detector 16 detects a press on the pairing button 10b (S401), the pairing executor 19 of the wearable device 10 shifts to the pairing mode as the connection standby state (S402).

Meanwhile, the pairing executor 25 of the master device 20 in the pairing mode, in other words, in the connection standby state (S403) starts pairing by executing inquiry processing to search for a slave (S404 and S405).

Then, the pairing executor 19 of the wearable device 10 in the pairing mode transmits a response to an inquiry signal from the master device 20 (S406 and S407). Accordingly, the pairing executor 25 of the master device 20 detects the wearable device 10 and executes paging processing (S408 and S409).

In response to this, the pairing executor 19 of the wearable device 10 in the pairing mode transmits a response to the master device 20 (S410 and S411). This completes pairing and hence connection between the master device 20 and the wearable device 10.

Then, the pairing executor 25 of the master device 20 notifies the BT address of the other device 60 to the connected wearable device 10 (S412 and S413). The pairing executor 25 of the master device 20 may additionally transmit the device name of the other device 60, for example. The pairing executor 19 of the wearable device 10 stores the received BT address of the other device 60 in the connection information DB 12 (S414).

Thereafter, if the operation detector 16 detects a press on the pairing button 10b (S415), the cancellation executor 18 of the wearable device 10 transmits a pairing cancellation request to the master device 20 (S416 and S417).

However, the cancellation responder 27 of the master device 20 does not receive the pairing cancellation request and does not transmit a permission response (S418). For example, the cancellation responder 27 does not receive the cancellation request when the wearable device 10 is positioned out of a range in which communication is possible.

The pairing executor 19 of the wearable device 10 thus executes inquiry processing by specifying the BT address received at S413 so as to search for the other device 60 in the connection standby state (S419 to S421).

Then, the other device 60 transmits a response to an inquiry signal from the wearable device 10 (S422 and S423). Accordingly, the pairing executor 19 of the wearable device 10 detects the other device 60 and executes paging processing (S424 and S425).

In response to this, the other device 60 in the pairing mode transmits a response to the wearable device 10 (S426 and S427). This completes pairing and hence connection between the other device 60 and the wearable device 10.

As described above, pairing from a slave to a master at a specified BT address enables pairing with another master without putting the slave in the pairing mode. In this manner, new pairing can be established outside where no paired master is nearby. For example, even when performing pairing with a new master at a visited place such as an office, the wearable device 10 can execute the pairing processing from the wearable device 10 to the new master by previously establishing pairing with the master.

[d] Embodiment 4

Although the embodiments of the present invention are described above, the present invention may be achieved in various kinds of different modes other than the embodiments.

Pairing Cancellation Method

The above-described embodiments each describe the example in which the wearable device 10 and the master device 20 delete the connection-destination information of "device name, BT address, connection state" at a timing of pairing cancellation, but the present invention is not limited thereto. For example, the wearable device 10 and the master device 20 may only delete "connection state" in the connection-destination information of "device name, BT address, connection state" before canceling pairing. In the above-described example, the wearable device 10 changes "master device, D3:E4:F5:0C:1B:2A, paired" registered in the connection information DB 12 to "master device, D3:E4:F5:0C:1B:2A, standby".

In other words, the wearable device 10 and the master device 20 may delete what is called pairing information acquired through mutual authentication. Whether to execute data deletion or data change in cancellation processing may be optionally set and changed. If the data deletion is executed, for example, address information of one of a master and a slave being paired is deleted, and thus high security is achieved. If the data change is executed, a BT address can be stored, thereby shortening a time to establish connection again with the same master or slave in pairing.

Removal of Battery

For example, when a battery mounted on the wearable device 10 is removed, the wearable device 10 deletes various kinds of data stored in the data DB 11 by using electricity previously supplied and charged from the battery. In addition, when the battery is removed and then attached again to start electricity supply, the wearable device 10 may delete various kinds of data stored in the data DB 11 and also delete the connection-destination information before canceling pairing.

Pairing Cancellation Timing

For example, when the pairing button 10b is pressed, the wearable device 10 transmits a pairing cancellation request. The press on the pairing button 10b is performed when, for example, switching is executed between masters, a master has failed, or the wearable device 10 is initialized. Having received a denial notification from the master device 20, the wearable device 10 may notify the user through warning sound or vibration. The wearable device 10 receives no response from the master device 20 when the wearable device 10 goes out of a range in which communication is possible with the master device 20 or when the master device 20 is turned off. The wearable device 10 thus may end pairing cancellation processing after a predetermined time has passed.

Backup

The above-described embodiments describe the example in which the wearable device 10 deletes data stored in the data DB 11 before canceling pairing, but the present invention is not limited thereto. For example, the wearable device 10 may transmit data to the master device 20 to back up the data before deleting the data.

Short-Distance Wireless Communication

The above-described embodiments describe the example in which BT is applied to communication between the wearable device 10 and the master device 20, but the present invention is not limited thereto. Similar processing can be performed with other short-distance wireless communication such as NFC.

Automatic Response

The above-described embodiments describe the example in which, having received a cancellation request from the wearable device 10, the master device 20 receives selection of permission or denial from the user and responds to the wearable device 10, but the present invention is not limited thereto. For example, when the BT address of the transmission origin of a cancellation request is stored in the connection information DB 22, the master device 20 may automatically transmit a permission response to the cancellation request. The condition to execute the automatic response is not limited to the BT address. The condition may be previously determined between a master and a slave, such as transmission of an added particular message.

System

The devices illustrated in FIG. 3 do not always need to be configured physically as illustrated. In other words, the device may be distributed or integrated in arbitrary units. For example, the cancellation executor 18 and the pairing executor 19 may be integrated. In addition, all or an optional part of the processing functions executed at the devices may be achieved by a CPU and a computer program analyzed and executed by this CPU or achieved as wired logic hardware.

The whole or a part of the automatically performed processing described in the present embodiments may be manually performed. Alternatively, the whole or a part of the manually performed processing in the description may be automatically performed by the well-known method. In addition, the processing procedures, the control procedures, the specific names, and the information including various data and parameters presented in the description above and the drawings may be optionally changed unless otherwise stated.

Hardware of Wearable Device 10

Figure 13:
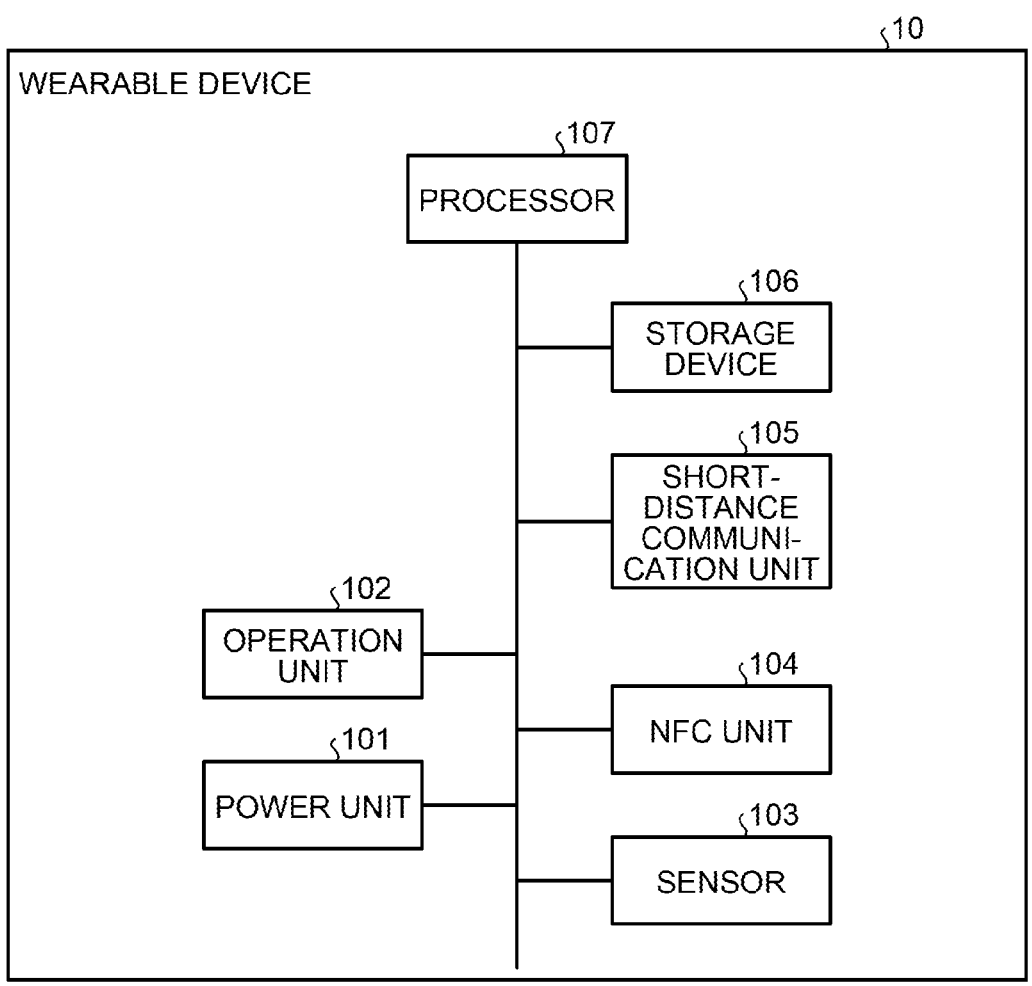
FIG. 13 illustrates an exemplary hardware configuration of the wearable device.

FIG. 13 illustrates an exemplary hardware configuration of the wearable device 10. As illustrated in FIG. 13, the wearable device 10 includes a power unit 101, an operation unit 102, a sensor 103, an NFC unit 104, a short-distance communication unit 105, a storage device 106, and a processor 107. These units are connected with each other through, for example, a bus to achieve mutual communication therebetween. The hardware configuration described herein is exemplary, and the wearable device 10 may include other pieces of hardware such as hardware and a mouse that perform wireless communication.

The power unit 101 supplies electricity to the other units. Examples of the operation unit 102 include a button, and the operation unit 102 receives a user operation. Examples of the sensor 103 include various sensors such as a pedometer sensor, an acceleration sensor, and a blood pressure sensor. The sensor 103 measures a blood pressure, a pulse, a heart rate, the amount of activity, the number of steps, and position information, for example.

The NFC unit 104 executes NFC communication. The short-distance communication unit 105 executes short-distance communication such as BT. The storage device 106 stores therein the DBs illustrated in FIG. 3. Examples of the storage device 106 include a random access memory (RAM) such as a synchronous dynamic random access memory (SDRAM), a read only memory (ROM), and a flash memory.

The processor 107 executes a computer program that executes the same processing as that of each processor illustrated in, for example, FIG. 3, so as to operate a process that executes the corresponding function described with reference to, for example, FIG. 3. In other words, this process executes the same function as that of each processor included in the wearable device 10. Specifically, the processor 107 reads out from, for example, the storage device 106, a computer program having the same function as that of each of the short-distance communicator 13, the sensor 14, the transmitter 15, the operation detector 16, the determiner 17, the cancellation executor 18, and the pairing executor 19. Then, the processor 107 executes a process that executes the same processing as that of each of the short-distance communicator 13, the sensor 14, the transmitter 15, the operation detector 16, the determiner 17, the cancellation executor 18, and the pairing executor 19.

Examples of the processor 107 include a central processing unit (CPU), a digital signal processor (DSP), a field programmable gate array (FPGA), and a programmable logic device (PLD).

As described above, the wearable device 10 reads out and executes a computer program so as to operate as an information processing device that executes an information leak prevention method. This computer program is recorded in a computer-readable recording medium such as a hard disk, a flexible disk, a compact disc read only memory (CD-ROM), a magneto optical (MO) disk, or a Digital Versatile Disk (DVD). Then, the computer program can be executed by being read out from the recording medium by a computer.

Hardware of Master Device 20

Figure 14:
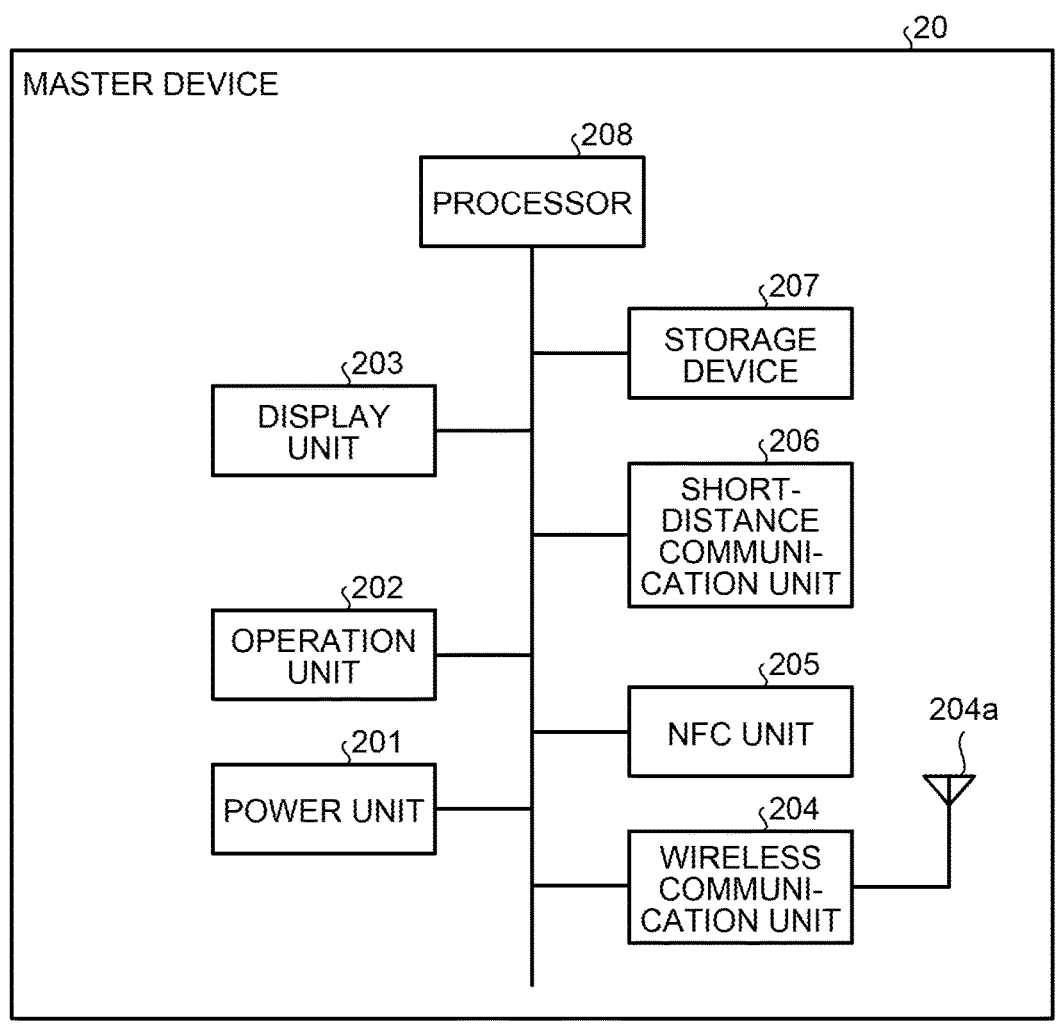
FIG. 14 illustrates an exemplary hardware configuration of the master device.

FIG. 14 illustrates an exemplary hardware configuration of the master device 20. As illustrated in FIG. 14, the master device 20 includes a power unit 201, an operation unit 202, a display unit 203, a wireless communication unit 204, an NFC unit 205, a short-distance communication unit 206, a storage device 207, and a processor 208. These units are connected with each other through, for example, a bus to achieve mutual communication therebetween. The hardware configuration described herein is exemplary, and the master device 20 may include another piece of hardware such as a mouse.

The power unit 201 supplies electricity to the other units. Examples of the operation unit 202 include a button, and the operation unit 202 receives a user operation. Examples of the display unit 203 include a display and a touch panel. The display unit 203 displays various kinds of information.

The wireless communication unit 204 executes wireless communication such as Long Term Evolution (LTE) through an antenna 204a, and executes communication with the cloud server, for example. The NFC unit 205 executes NFC communication. The short-distance communication unit 206 executes short-distance communication such as BT. The storage device 207 stores therein the DBs illustrated in FIG. 3, and examples thereof include a RAM such as an SDRAM, a ROM, and a flash memory.

The processor 208 executes a computer program that executes the same processing as that of each processor illustrated in, for example, FIG. 3, so as to operate a process that executes the corresponding function described with reference to, for example, FIG. 3. In other words, this process executes the same function as that of each processor included in the master device 20. Specifically, the processor 208 reads out from, for example, the storage device 207, a computer program having the same function as that of each of the short-distance communicator 23, the communicator 24, the pairing executor 25, the data processor 26, and the cancellation responder 27. Then, the processor 208 executes a process that executes the same processing as that of each of the short-distance communicator 23, the communicator 24, the pairing executor 25, the data processor 26, and the cancellation responder 27. Examples of the processor 208 include a CPU, a DSP, a FPGA, and a PLD.

As described above, the master device 20 reads out and executes a computer program so as to operate as an information processing device that executes an information leak prevention method. This computer program is recorded in a computer-readable recording medium such as a hard disk, a flexible disk, a CD-ROM, a MO disk, or a DVD, and can be executed by being read out from the recording medium by a computer. The computer program in other embodiments is not limited to execution by the master device 20. For example, the present invention can be also applied to a case in which the computer program is executed by another computer or server, and a case in which the computer program is executed cooperatively by these computer and server.

According to an embodiment, data leak can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal comprising:
   a memory; and
   a processor that is connected to the memory, wherein the processor executes a process including:
   first transmitting data stored in the memory to a device registered as a transmission destination of the data when communication is possible with the device;
   second transmitting a request to cancel registration of the device to the device; and
   when a permission to cancel the registration of the device is received from the device, canceling the registration and waiting for registration of a device with which communication is possible.

2. The terminal according to claim 1, wherein:
   the second transmitting includes transmitting a request to cancel registration of a first device registered as the transmission destination to the first device, and when a response to the request is not received from the first device, transmitting a request to cancel the registration of the first device to a second device previously registered as the transmission destination,
   the cancelling includes cancelling the registration of the first device when a permission is received from the second device, and
   the waiting includes waiting for registration of the device with which communication is possible when the registration of the first device is canceled.

3. The terminal according to claim 1, the process further comprises:
   acquiring device information on a device specified as the transmission destination of the data from the device registered as the transmission destination of the data; and
   transmitting, having received from the device registered as the transmission destination of the data, no response to the request to cancel the registration of the device, a request to register the terminal as a transmission origin of the data, to the specified device by using the device information.

4. The terminal according to claim 1, wherein the cancelling includes deleting the data stored in the memory before canceling the registration of the device registered as the transmission destination of the data.

5. The terminal according to claim 1, wherein the cancelling includes deleting, having detected removal of a removable battery that supplies electricity from the terminal driven by the battery, the data stored in the memory and cancelling the registration of the device registered as the transmission destination of the data.

6. The terminal according to claim 1, wherein:
the second transmitting includes requesting pairing cancellation to the device registered as the transmission destination of the data and paired with the terminal as a wearable terminal, and
having received a permission for the pairing cancellation from the device, the cancelling includes cancelling the pairing with the device and shifting the terminal to a state in which the terminal is configured to receive another request for pairing.

7. An information leak prevention method comprising:
transmitting data stored in a storage unit to a device registered as a transmission destination of the data when communication is possible with the device, using a processor;
transmitting a request to cancel registration of the device to the device, using the processor; and
canceling, when a permission to cancel the registration of the device is received from the device, the registration of the device and waiting for registration of a device with which communication is possible, using the processor.

8. A non-transitory computer-readable recording medium having stored therein an information leak prevention program that causes a terminal to execute a process comprising:
transmitting data stored in a storage unit to a device registered as a transmission destination of the data when communication is possible with the device;
transmitting a request to cancel registration of the device to the device; and
canceling, when a permission to cancel the registration of the device is received from the device, the registration of the device and waiting for registration of a device with which communication is possible.

* * * * *